June 5, 1923.
A. E. TINKER
COMBINATION TAIL LIGHT AND DIRECTION INDICATOR
Filed March 16, 1921
1,457,473
2 Sheets-Sheet 1
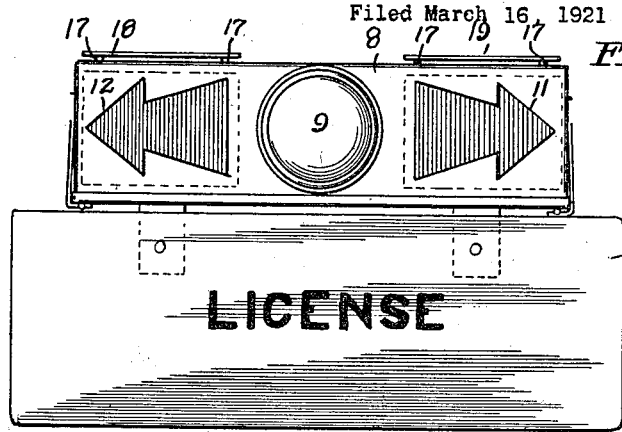
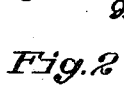
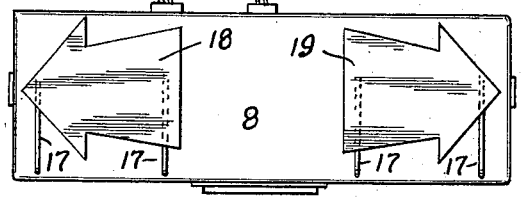
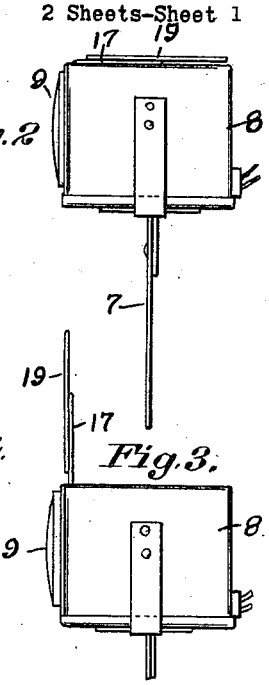
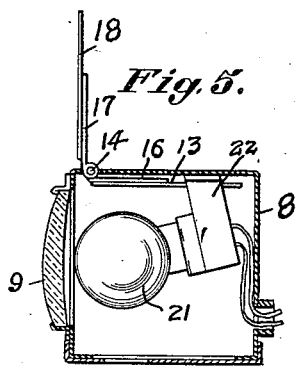
Witness.
R. Olsen
Inventor.
A. E. Tinker
By Munn & Co
Attorney June 5, 1923.
A. E. TINKER
1,457,473
COMBINATION TAIL LIGHT AND DIRECTION INDICATOR
Filed March 16, 1921    2 Sheets-Sheet 2
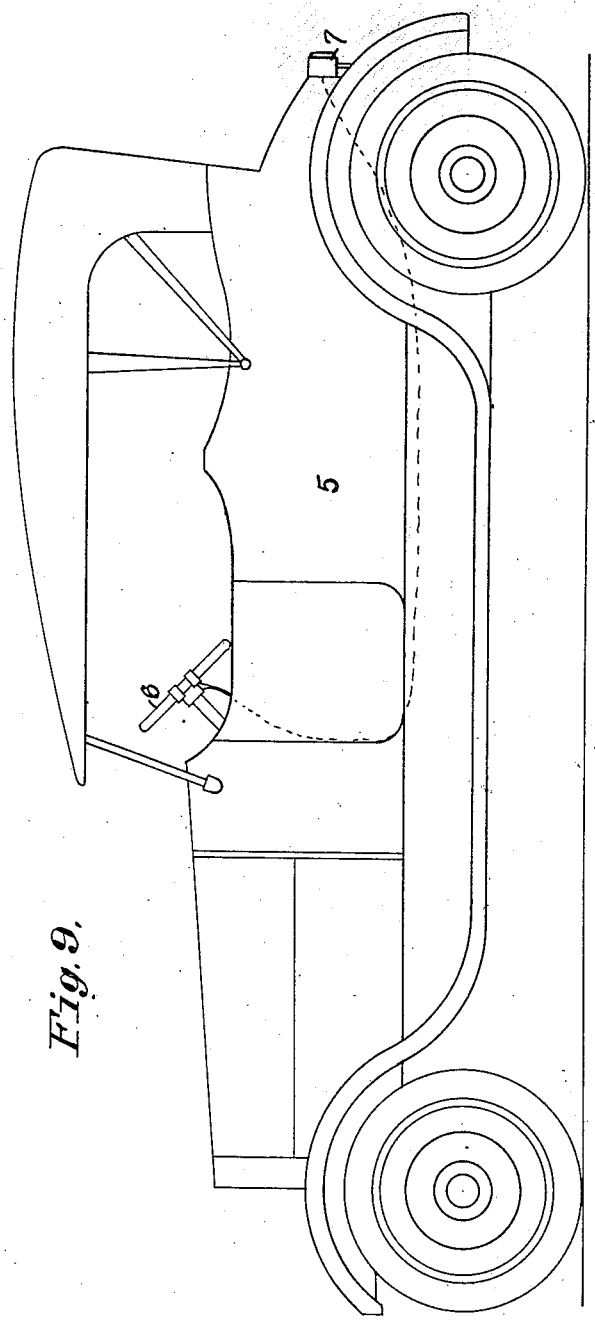
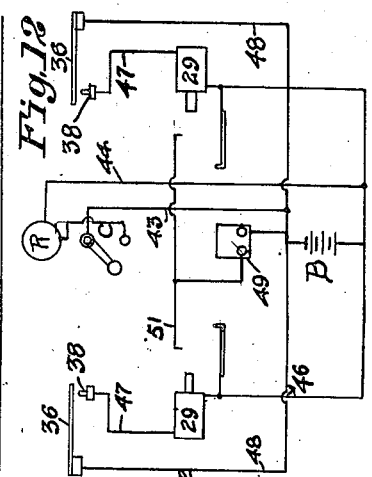
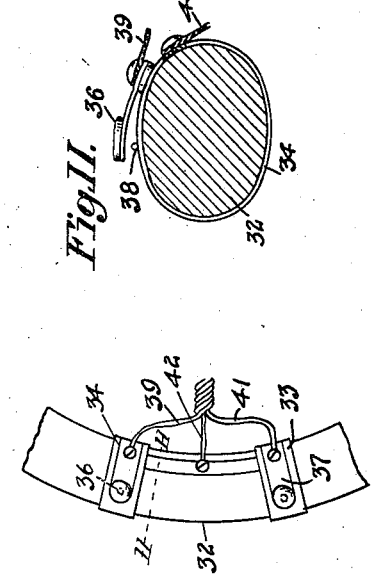
Witness.
L. Olsen
Inventor.
A. E. Tinker
By Munn & Co
Attorney Patented June 5, 1923.

1,457,473

UNITED STATES PATENT OFFICE.

ALFRED E. TINKER, OF STOCKTON, CALIFORNIA.

COMBINATION TAIL LIGHT AND DIRECTION INDICATOR.

Application filed March 16, 1921. Serial No. 452,881.

*To all whom it may concern:*

Be it known that I, ALFRED E. TINKER, a citizen of the United States, and resident of Stockton, in the county of San Joaquin and State of California, have invented a new and useful Improvement in Combination Tail Lights and Direction Indicators, of which the following is a specification.

This invention relates to an improvement in direction indicators, and has reference more particularly to that type of indicator which is adapted to be applied to the rear of an automobile so that the driver thereof can indicate his intentions relative to maneuvers he is about to execute.

The principal object of my invention is to construct an indicator which may be remotely placed upon a car with respect to the driver, and which may be operated in an efficient manner and without the necessity of the operator removing his hands from the steering wheel of the car upon which the same is mounted.

Another object is to produce an indicator which will be visible during both the day and night.

Another object is to produce an indicator which will have an audible device in connection therewith, which audible device will indicate to the driver that his signals have operated.

Another object is to produce a signal which will be exceedingly simple, both as to construction and wiring arrangement and one which will be cheap to manufacture and of such simple construction that the danger of the same becoming inoperative through derangement of parts will be practically eliminated.

With these and other objects in view, reference will now be made to the accompanying drawings in which Fig. 1 is a rear elevation of my signal, the same being attached to a license plate of an automobile; Fig. 2 is a side elevation of Fig. 1; Fig. 3 is a side elevation similar to Fig. 1, but with one of the signals raised; Fig. 4 is a top plan view of Fig. 1; Fig. 5 is a cross sectional view on the line 5—5 Fig. 8; Fig. 6 is a cross-sectional view on the line 6—7 Fig. 8; Fig. 7 is a cross section similar to Fig. 6, but with the signal in a closed position; Fig. 8 is a cross section taken on the line 8—8, Fig. 6; Fig. 9 is a diagrammatical view of an automobile showing my signal placed thereon; Fig. 10 is a fragmentary sectional view of a steering wheel showing my signal contacts mounted thereon; Fig. 11 is a cross section on the line 11—11, Fig. 10; and Fig. 12 is a diagrammatical view of the wiring arrangement of my signal.

Referring to the drawings in detail, like numerals correspond to similar parts in the several views.

The numeral 5 designates an automobile as a whole having a steering wheel 6 and license plate 7. It is to this license plate 7 that I preferably attach my signal. It is obvious, however, that the same might be positioned upon any part of the vehicle, which would be readily visible to a following vehicle or other traffic.

The signal consists of a box 8, preferably rectangular in shape and carrying a lens 9 centrally disposed in its front face. This lens should preferably correspond to the tail light of the car and it is one of the purposes of my signal to eliminate the tail light, substituting my device therefor.

The numerals 11 and 12 designate orifices stamped at each side of the lens 9, these orifices being in the shape of arrows and pointing in opposite directions, the opening 11 forming the right hand arrow and the opening 12 forming the left hand arrow. These openings 11 and 12 are normally closed by plates such as are shown at 13, which plates are supported upon hinged members 14, there being two hinged members for each plate.

Each hinged member is provided with arms 16, and 17, which are 90 degrees removed from each other, the result being that the arms 17 are so positioned as to protrude from the box 8, and the arms 16 to protrude into the box 8.

At 18 and 19 I have shown arrows, formed preferably from metal, attached to the arms 17.

Referring now to Fig. 5, it will be noted that I have placed an electric light 21 within the box 8 and have supported the same by a bracket 22. It is obvious, however, that this light may be supported in any convenient manner.

Referring now to Figs. 6 and 7, it will be noted that a loop 23 is formed upon the rear of the plates 13, the purpose of which is to be engaged by the bent end 24 of a wire 26, having its opposite end hinged as shown at 27 to the lower corner of the box 8. This wire 26, in passing from the loop 23 to the hinge 27 is bent and passes through an opening formed in the armature 28 of a solenoid 29, which solenoid is supported upon a bracket 31, attached to the rear of the box 8.

By referring to Fig. 8, it will be noted that each plate 13 is operated in a similar manner, but for the purpose of simplicity I have described but one actuating mechanism, the two being identical.

Referring now to Fig. 10, the numeral 32 represents a portion of the steering wheel 6 of the automobile. To this steering wheel, I attach two bands 33 and 34 spaced one from the other and serving to support spring contacts 36 and 37, which spring contacts are adapted to engage a pin 38, carried upon each band 33 and 34 for the purpose of making electrical connection between the wires 39 and 41 and the common return wire 42.

The wires 39 and 41 leading to the solenoids located in the box 8 upon the rear of the car.

By referring now to Fig. 12, the circuit of wiring is here illustrated, and, for the purpose of simplicity, I will describe but one circuit, as the two are identical.

The letter R represents the lens 9 and the letter B the battery of a car. The letter C refers to a switch which may be conveniently located, the closing of which will cause the current to flow from the battery, through the wire 43, through the light 6, and through wire 44, back to the battery.

By referring now to the left hand portion of this figure, it will be noted that by depressing the spring contact 36, the same will contact with the pin 38. This will complete the circuit and the current will then flow through from the battery B, through wire 46, solenoid 29, pin 38, contact 36, wire 48 and back to the battery B. The action of the solenoid 29 will raise the plate 13 and cause current to flow therethrough to a contact 51 from which contact the current will return to the battery through the buzzer 49, thus giving an audible signal.

If it be day time, this arrow 18 being bright will give a warning or if it be night time, the uncovering of the orifice 12 will allow the same to be illuminated by the light 21. Thus it will be seen that I have provided a very simple arrangement, which will indicate the direction of the maneuver which is to be executed, whether it be night or day.

It is obvious that by depressing both contacts 36 and 37 simultaneously, the signal will operate to expose both arrows and so act as a stop signal.

I claim:

1. In a signal of the class described, a light box made to be mounted upon an automobile, a light in said box, an opening in the front of the box through which the light is adapted to be projected for signaling purposes, a cover hinged within the light box adapted to normally overlie said opening, a plate mounted upon the top of the light box and exteriorly thereof and connected to said cover at right angles thereto, said plate adapted to be actuated through the movement of said cover and normally lying flat upon the top of the light box when the cover is overlying the opening in the front of the light box, and a signal on the face of said plate adapted to be displayed when the plate is moved to upstanding position upon the top of the light box when the cover is moved away from the opening in the light box.

2. In a signal of the class described, a light box made to be mounted upon an automobile, a light in said box, an opening in the front of the box through which the light is adapted to be projected for signaling purposes, a cover hinged within the light box adapted to normally overlie said opening, a plate mounted upon the top of the light box and exteriorly thereof and connected to said cover at right angles thereto, said plate adapted to be actuated through the movement of said cover and normally lying flat upon the top of the light box when the cover is overlying the opening in the front of the light box, and a signal on the face of said plate adapted to be displayed when the plate is moved to upstanding position upon the top of the light box when the cover is moved away from the opening in the light box, the means for actuating said cover and said plate comprising a solenoid mounted within the light box and an operating connection between said solenoid and said cover.

ALFRED E. TINKER.